United States Patent
Hsu et al.

(10) Patent No.: US 8,421,301 B2
(45) Date of Patent: Apr. 16, 2013

(54) REINFORCEMENT STRUCTURE FOR DISC MOTOR

(75) Inventors: Shih-Hsin Hsu, Taipei County (TW); Shih-Hsiang Chien, Yilan County (TW); Chou-Zong Wu, Hsinchu (TW); Yee-Pien Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 181 days.

(21) Appl. No.: 12/980,721

(22) Filed: Dec. 29, 2010

(65) Prior Publication Data
US 2012/0086303 A1    Apr. 12, 2012

(30) Foreign Application Priority Data

Oct. 12, 2010  (TW) ................................ 99134698 A

(51) Int. Cl.
*H02K 1/06* (2006.01)
(52) U.S. Cl.
USPC ........... 310/254.1; 310/216.118; 310/216.133
(58) Field of Classification Search .................... 310/43, 310/51, 254.1, 216.044, 216.045, 216.058, 310/310/216.086, 216.062, 216.118, 216.113, 310/216.133
See application file for complete search history.

(56) References Cited

U.S. PATENT DOCUMENTS

| | | | | |
|---|---|---|---|---|
| 3,693,035 A | * | 9/1972 | Ostwald | 310/51 |
| 6,211,587 B1 | * | 4/2001 | Enomoto et al. | 310/52 |

* cited by examiner

*Primary Examiner* — Dang Le
(74) *Attorney, Agent, or Firm* — WPAT PC; Justin King

(57) ABSTRACT

A reinforcement structure for a disc motor being received in the flat space formed at a side of a wheel center for driving the wheel to rotate as it can be activated to perform a rotation movement by the interactions of an electromagnetic field formed from its stators and a magnetic field resulting from its rotator, comprises: a rib structure, arranged inside a shell housing the disc-like stator for enhancing the structure integrity thereof without causing the thickness thereof to increase and thus maximizing the usefulness of the motor's limited space; and a fixing element, for fixing the stators to the inner side of the motor's outer shell for preventing the stators to be deformed by the magnetic force from the permanent magnets mounted on the rotors while preventing the stators from being attracted by the permanent magnets of the rotors, and thus enabling the motor to operate smoothly.

9 Claims, 4 Drawing Sheets

REINFORCEMENT STRUCTURE FOR DISC MOTOR

TECHNICAL FIELD

The present disclosure relates to a reinforcement structure for disc motor, and more particularly, to axial-flux disc motor with rib structure and stator fixture, in that by the disposing of the rib structure, not only its stators can be built lighter in weight for reducing the overall weight of the disc motor, but also the structure integrity of the motor's shell is improved for preventing the same from being deformed; and simultaneously, by the use of the stator fixture for fixedly securing the stators to the shell and thus enabling the same to resist the normal magnetic attraction from the permanent magnets of its rotors, the stators can be prevented from contacting to the rotors during the operation of the disc motor. Consequently, the disc motor can be built thinner but with good structure integrity.

TECHNICAL BACKGROUND

Hub motors are commonly found on electric bicycles, which are motors designed to be incorporate into a hub of a wheel for driving it to rotate directly. However, as each spoke in a bicycle rim is fixed to the hub, the installation of hub motor can be very time consuming. In addition, since rims from different bicycle manufacturers are produced with different specifications that are not standardized, all those rims may have to be redesigned for allowing the electric hub motor to be installed therein. Therefore, it is required to have an axial-flux disc motor that can be adapted for rims of different bicycle manufacturers as it can be attached and mounted to a side of any bicycle.

Moreover, most conventional disc motors are designed specifically for electronic products that can be activated with comparatively small power, so that while applying such conventional disc motors for driving vehicles such as bicycles, a serious shortage of torque outputted from such low-current disc motors may occur. On the other hand, although the conventional axial-flux motors for automotive applications are able to produce sufficient torque for driving vehicles, they are generally very bulky and built with thick and heavy structure due to their mechanical design. Thus, it is required to have a thin and light-weighted axial-flux disc motor capable of producing sufficient torque for automotive applications.

There are already many studies for overcoming the aforesaid shortcomings. One of which is an ultra-thin motor, disclosed in TW Pat. No. I303122, by that not only the assembly and mass production efficiencies of the motor are improved, but also the problem troubling the thinning of conventional radial air-gap motors, such as the stacking of magnetic materials, is resolved.

The second such study relates to an ultra-thin spindle motor with low run-out, disclosed in TW Pat. No. I260595, in that with the innovated internal mechanism designed inside the spindle motor, the problems troubling the conventional motors are improved in terms of operational smoothness and reduced thickness.

The third such study relates to an axial-flux motor for ceiling fans that is disclosed in TW Pat. No. M361170. Comparing with the conventional radial motors, not only the aforesaid motor is less complicated in structure and is capable of operating at a higher efficiency, but also it can be built thinner than those conventional radial motors while preserving a large effective flux area and thus operating at a higher driving efficiency. However, it may not be suitable for automotive applications as it is intended in the present disclosure.

The fourth such study relates to a heat sink of a motor configured with ribs, disclosed in TW Pat. No. I318036, in which heat emitting from heat-generating components of a high-power motor is transmitted from their corresponding fixtures to the motor base, ribs and frame of the motor and thus is dissipated. The ribs built inside the motor are acting not only for heat dissipation, but also for fixedly securing the internal components of the motor. However, the construction of the ribs is neither aiming for building a thinner motor, nor for reinforcing the structure integrity of the motor.

The fifth such study relates to a cooling device for external rotor motors, disclosed in TW Pat. No. 52985, in which there are ribs mounted on the rotors to be used for causing airflows during the operation of the motor, and the airflows that are flowing inside the flow channels designed inside the motor for heat dissipation will enable temperatures of the components inside the stators to be distributed evenly. However, the construction of the ribs is neither aiming for building a thinner motor, nor for reinforcing the structure integrity of the motor.

The sixth such study relates to an axial gap motor including a rotor and two stators, disclosed in U.S. Pat. No. 7,679,260 B2, in which the rotor has a rotor frame that is configure with a plurality of ribs to be used for improving the rigidity of the rotor, fixing the magnets of the rotor, and the suppression of the vibration and noise of the motor that are generated when the motor is in operation. However, the construction of the ribs is neither aiming for building a thinner motor.

The seventh such study relates to an axial gap electric motor having two stators, two rotors and two output shafts, disclosed in U.S. Pat. No. 7,256,524 B2. According to this configuration, the motor is cooled by a water jacket that is provided for cooling water to flow therethrough, and the two output shafts are capable of rotating independently at different rotation speeds. However, the aforesaid motor may not be suitable for automotive applications.

The eighth such study relates to a synchronous axial field electrical machine, disclosed in U.S. Pat. No. 7,170,212 B2. According to this configuration, the axial field electrical machine is basically a three-phase motor constructed with two rotors, one stator and two annular arrays of flat coils, i.e. a first annular array of flat coils and a second annular array of flat coils, that are arranged respectively on two different layers of the axial field electrical machine while enabling the coils of the second array to offset in a circumferential direction relative to the coils of the first array. However, the aforesaid synchronous axial field electrical machine is constructed neither aiming for building a thinner motor, nor for reinforcing the structure integrity of the motor.

Nevertheless, with reference to all the aforesaid patents, the currently available disc motors are designed specifically for electronic devices that are all small power motor since the coils capable of being embedded therein are micro/nano scaled that they can not sustain the current loads of other common-sized motors, not to mention that the torques that they can provided are limited and thus are not sufficient for any automotive applications. On the other hand, for those other conventional motors that can produce sufficient torque for driving a vehicle, they are generally very bulky and built with thick and heavy structure due to their mechanical design. Thus, it is required to have a thin and light-weighted axial-flux disc motor capable of producing sufficient torque for automotive applications.

Conventionally, the axial-flux motor is used in low-power, low-torque and high-speed applications, such as the electrical rotary motors in 3C electronic products including optical drivers and hard drives. Please refer to FIG. 1, which is a schematic diagram showing a conventional motor for optical drive. As shown in FIG. 1, the motor is comprised of: a back iron 11, a coil 12, an axis 13, a bearing 14 and a yoke 15. As the motor is a coreless structure whose coil 12 is winding on the back iron 11, the power and the torque produced thereby are comparatively smaller so that the motor can only be adapted for limited application. Please refer to FIG. 2, which is a schematic diagram showing a conventional disc motor. As shown in FIG. 2, the motor comprises: a stator frame 21, a motor 22, a coil 23, a bearing 24, a rotor frame 25, a bearing 26, a rotor 27, a fixing screw 28 and a permanent magnet 29. As the axial-flux disc motor of FIG. 2 can achieve a larger effective flux area, it can produce high power and high torque outputs. Nevertheless, owing to the generation of such high power and high torque outputs, huge normal force will be generated during the operation of the motor, that can achieve 3000 newtons (N) to 4000 newtons (N). Due to the structural deficiency of the disc motor and the generation of the huge normal force, the disc motor can easily be deformed which may cause the air gap inside the motor to deform accordingly for adversely affecting the operation smoothness of the motor, or even damaging the same.

Therefore, it is in need of a disc motor adapted for high-power and high-torque applications that is capable of achieving a torque density that is larger than 6 Nm/kg without causing any structural deformation to its thinness while outputting a large torque.

TECHNICAL SUMMARY

In view of the above shortcomings, the object of the present disclosure is to provide a reinforcement structure for disc motor, and more particularly, to axial-flux disc motor with rib structure and stator fixture, in that by the disposing of the rib structure, not only its stators can be built lighter in weight for reducing the overall weight of the disc motor, but also the structure integrity of the motor's shell is improved for preventing the same from being deformed; and simultaneously, by the use of the stator fixture for fixedly securing the stators to the shell and thus enabling the same to resist the normal magnetic attraction from the permanent magnets of its rotors, the stators can be prevented from contacting to the rotors during the operation of the disc motor. Consequently, the disc motor can be built thinner but with good structure integrity.

To achieve the above object, the present disclosure provide a disc motor with reinforcement structure, comprising: a rotor; a stator, configured with a plurality of armatures and a plurality of through holes respectively formed on the armatures selected from the plural armatures, while having a plurality of locking grooves formed at the bottom thereof; a stator frame, having a plurality of holes formed thereon at positions corresponding to the through holes; a plurality of reinforcement ribs, being arranged attaching to the inner surface of the stator frame at positions corresponding to the locking grooves; a coil, being disposed winding on the stator; a rotor frame; a bearing; and a permanent magnet, mounted on the rotor; a plurality of fixing elements; wherein, by inserting the fixing elements into the through holes of the stator via the holes formed on the stator frame and insetting the reinforcement ribs into the corresponding locking grooves formed on the bottom of the stator, the stator and the stator frame are fixedly integrated.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
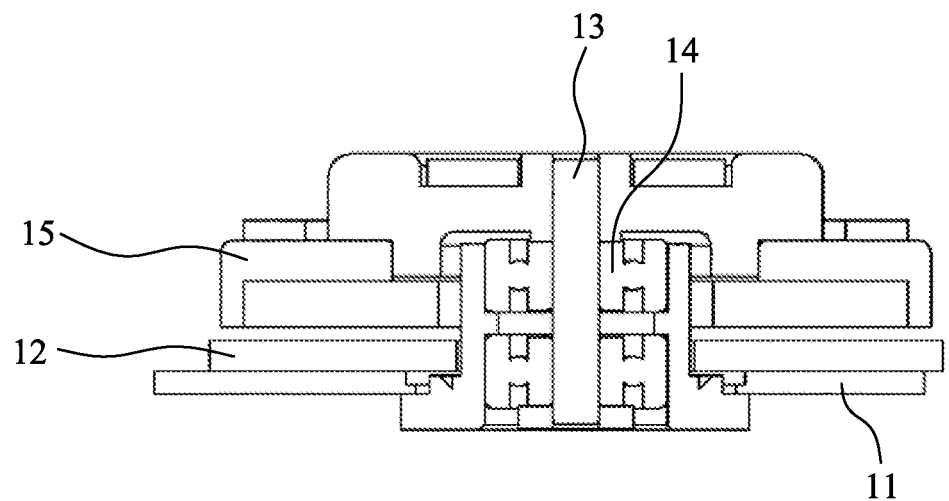
FIG. 1 is a schematic diagram showing a conventional motor for optical drive.
Figure 2:
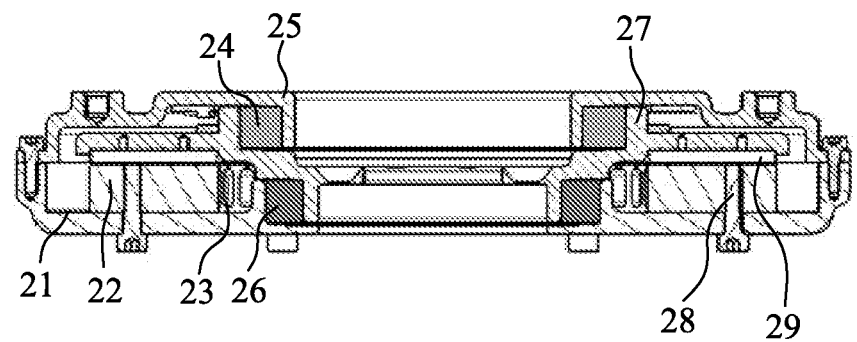
FIG. 2 is a schematic diagram showing a conventional disc motor.

Similar to the conventional disc motor shown in FIG. 2, a disc motor of the present disclosure also comprises: a stator frame 21, a stator 22, a coil 23, two bearings 24 26, a stator frame 25, a rotor 27 and a permanent magnet 26. However, there is no fixing screw being used in the disc motor of the present disclosure as it is replaced by fixing elements of various designs. Similar to that shown in FIG. 2, the permanent magnet 29, being mounted on the rotor 27, and the coil 23, being arranged winding on the stator 22 are disposed in a manner that the stator 22 is disposed corresponding to the permanent magnet 29 while being spaced by an air gap of a specific interval. The casing of the disc motor is composed of a stator frame 21 and a rotor frame 25, whereas the stator 22 is fixed inside the stator frame 21. The stator frame 21 is configured for enabling the same to rotate relative to the rotor 27 by the support of the bearing 26, while the rotor 27 is configured for enabling the same to rotate relative to the rotor frame 25 by the support of the bearing 24. Moreover, the stator frame 22 and the rotor frame 25 are fixed by the use of screws or rivets. Since the stator 22 is usually made of a conductive material, such as silicon steel or a soft magnetic composite (SMC), it can be deformed by the pulling and attracting from the magnetic force induced by the permanent magnet 29 and thus the performance of the motor can be adversely affected or even damaged since the deformation of the stator can cause the width of the air gap to change. Thus, the disc motor is configured with a reinforcement structure for preventing the motor from being damaged by the stator deformation.

Figure 3:
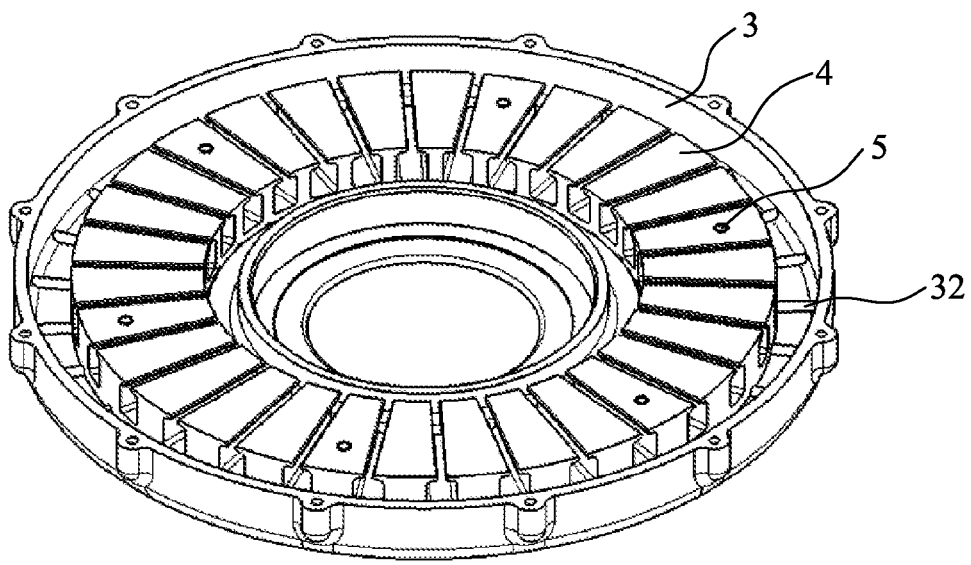
FIG. 3 is a schematic diagram showing a stator of a disc motor is fixed to its stator frame by the use of fixing elements according to the present disclosure.
Figure 4:
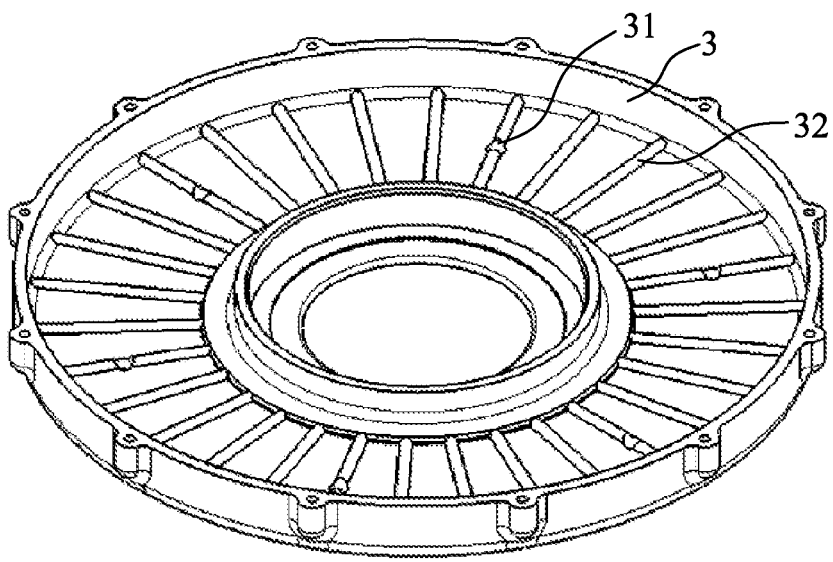
FIG. 4 is a schematic diagram showing a stator frame of the present disclosure.
Figure 5:
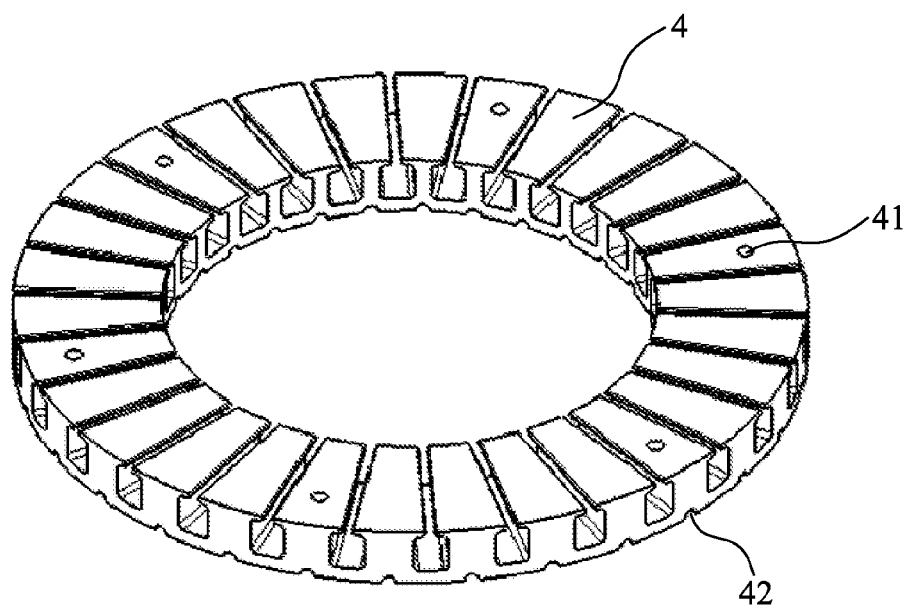
FIG. 5 is a schematic diagram showing a stator of the present disclosure.
Figure 6:
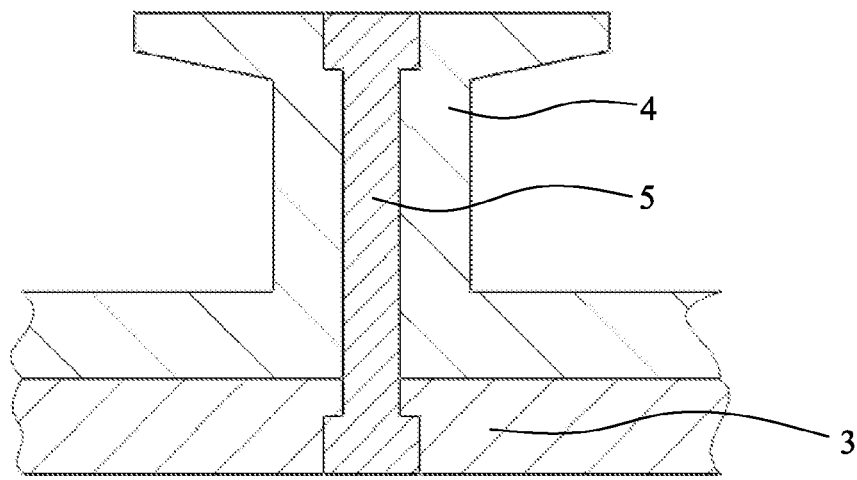
FIG. 6 is a schematic diagram showing a stator of a disc motor is fixed to its stator frame by the inserting of fixing elements into the through holes of the stator via the corresponding holes formed on the stator frame according to the present disclosure.
Figure 7:
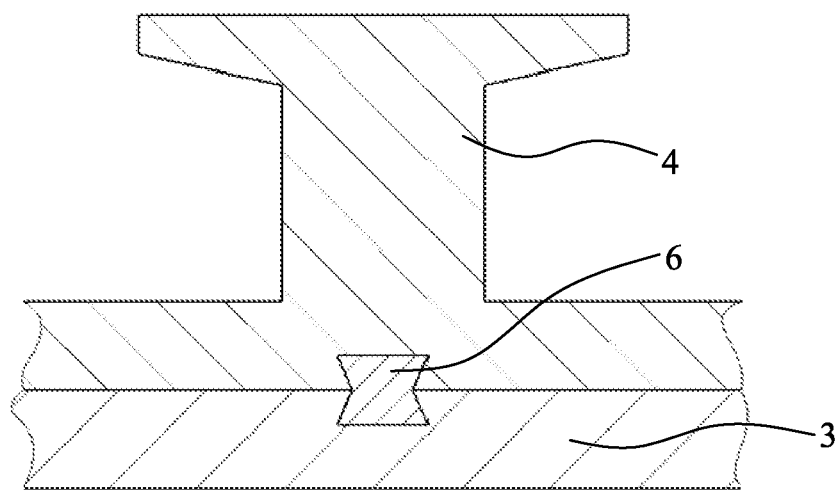
FIG. 7 is a schematic diagram showing a stator of a disc motor is fixed to its stator frame by the insetting of the combination keys into corresponding indentations formed respectively on the stator and the stator frame according to the present disclosure.

Please refer to FIG. 3, FIG. 4 and FIG. 5, which are a schematic diagram showing a stator of a disc motor is fixed to its stator frame by the use of fixing elements according to the present disclosure, a schematic diagram showing a stator frame of the present disclosure, and a schematic diagram showing a stator of the present disclosure. It is noted that the disc motor of the present disclosure is featured by the use of fixing elements 5 for fixing the stator to its stator frame. As shown in FIG. 4 and FIG. 5, there is a plurality of holes 31 formed on the stator frame 3 and correspondingly there is a plurality of through holes 41 formed on the armatures of the stator 4, that are provided for fixing elements to inserted therethrough so as to fixing the stator 4 to the stator frame 3 and thus enable the stator 4 to resist the magnetic force from the permanent magnet 29 illustrated in FIG. 2 for preventing the disc motor from any structural destruction. Each of the fixing elements 5 can be a component selected from the group consisting of: a screw, rivet, and a combination key, whereas the screw and the rivet are used for fixing the stator in a vertical direction, while the combination key is used for fixing the stator in a horizontal direction. Please refer to FIG. 6, which is a schematic diagram showing a stator of a disc motor is fixed to its stator frame by the inserting of fixing elements into the through holes of the stator via the corresponding holes formed on the stator frame according to the present disclosure. In FIG. 6, each of the fixing elements 5 is install vertically with respect to the stator 4 and the stator frame 3, so that there are corresponding holes 31, 41 formed respectively on the stator frame 31 and the stator 3 to be provided for the fixing elements 5, such as screws or rivets, to pass therethrough. Please refer to FIG. 7, which is a schematic diagram showing a stator of a disc motor is fixed to its stator frame by the insetting of the combination keys into corresponding indentations formed respectively on the stator and the stator frame according to the present disclosure. The fixing of the stator 4 to the stator frame 3 shown in this embodiment is enabled in a way different from the embodiment shown in FIG. 6, which is enabled by the use of combination keys 6 that can fix the stator 4 to the stator frame 3 horizontally. For doing so, the stator 4 and the stator frame 3 should be formed respectively with a plurality of horizontal-disposed indentations, and thus, by insetting the combination keys into those indentations, the stator 4 is fixed to the stator frame 3.

As shown in FIG. 4 and FIG. 5, by the construction of locking grooves 41 on the bottom of the stator 4 at positions where the magnetic flux is minimum or ever zero, and correspondingly the reinforcement ribs 32 on the stator frame 3, the structure integrity of the disc motor is enhanced without affecting the thickness of the disc motor. As the reinforcement ribs are constructed inside the disc motor, they can enhance the structural integrity of the stator frame 3 effectively without causing any increment to the thickness of the same, enabling the stator to resist the magnetic force from the permanent magnet 29 so as to ensure the disc motor to operate smoothly.

Therefore, the present disclosure provide a disc motor with reinforcement structure, comprising: a rotor; a stator 4, configured with a plurality of armatures and a plurality of through holes 41 respectively formed on the armatures selected from the plural armatures, while having a plurality of locking grooves 42 formed at the bottom thereof; a stator frame 3, having a plurality of holes 31 formed thereon at positions corresponding to the through holes 41; a plurality of reinforcement ribs 32, being arranged attaching to the inner surface of the stator frame 3 at positions corresponding to the locking grooves 42; a coil, being disposed winding on the stator; a rotor frame; a bearing; and a permanent magnet, mounted on the rotor; a plurality of fixing elements 5; wherein, by inserting the fixing elements into the through holes 41 of the stator 4 via the holes 31 formed on the stator frame 3 and insetting the reinforcement ribs 32 into the corresponding locking grooves 42 formed on the bottom of the stator 4, the stator 4 and the stator frame 3 are fixedly integrated. Moreover, Each of the fixing elements 5 can be a component selected from the group consisting of: a screw, rivet, and a combination key 6, whereas the screw and the rivet are used for fixing the stator 4 in a vertical direction, while the combination key 6 is used for fixing the stator 4 in a horizontal direction. In addition, in correspondence to the insetting of the combination keys 6, the holes 31, 41 are formed as dovetail indentations, by that the joint strength of the combination keys 6 can be enhanced. It is noted that the locking groove 42 can be formed as a bar-like slot, and the corresponding reinforcement rib 32 can be formed as a bar, whereas the locking grooves 42 are formed on the bottom centers of armatures selected from the plural armatures of the stator 4.

From the disclosures with respect to FIG. 2 to FIG. 7, it is noted that the object of the present disclosure is to provide a disc motor with reinforcement ribs and fixing elements, in that by the disposing of the rib structure, not only its stators can be built lighter in weight for reducing the overall weight of the disc motor, but also the structure integrity of the motor's shell is improved for preventing the same from being deformed; and simultaneously, by the use of the stator fixture for fixedly securing the stators to the shell and thus enabling the same to resist the normal magnetic attraction from the permanent magnets of its rotors, the stators can be prevented from contacting to the rotors during the operation of the disc motor. Consequently, the disc motor can be built thinner but with good structure integrity. In detail, the present disclosure relates to a disc motor with reinforcement structure, in which the disc motor, being a motor configured with disc-like stators and disc-like rotors, is used primarily in the flat space formed at a side or at the center of a wheel center for driving the wheel to rotate; and in addition, the motor is activated to perform a rotation movement, i.e. the rotator is enabled to rotated, by the interactions of an electromagnetic field formed from the passing of an electric current through the armatures of the stator and a magnetic field resulting from the permanent magnet of the rotator. Thereby, the reinforcement structure has a plurality of ribs, that are arranged inside a stator frame housing the disc-like stators for enhancing the structure integrity thereof without causing the thickness thereof to increase so as to maximizing the usefulness of the motor's limited space. Moreover, the reinforcement structure further has a plurality of fixing elements that are used for fixing the stator to the inner side of the stator frame for preventing the stator to be deformed by the normal magnetic force from the permanent magnet mounted on the rotor while preventing the stator from being attracted by the permanent magnet of the rotor, and thus enabling the motor to operate smoothly. Consequently, the disc motor of the present disclosure is suitable for electrical automotive applications.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A reinforcement structure for a disc motor, comprising:
   a stator, configured with a plurality of armatures on a top side of said stator, a plurality of stator holes formed on said plurality of armatures, and a plurality of locking grooves formed at a bottom side of said stator, wherein each of said plurality of stator holes is corresponding to one of said plurality of locking grooves;
   a stator frame, having a plurality of reinforcement ribs and a plurality of frame holes, wherein said plurality of frame holes formed on said plurality of reinforcement ribs; and
   a plurality of fixing elements;
   wherein said stator is attached to the stator frame by placing said plurality of locking grooves onto said plurality of reinforcement ribs, and then securing said stator by inserting the fixing elements through said frame holes and stator holes.

2. The disc motor with reinforcement structure of claim 1, wherein each of the fixing elements is a component selected from the group consisting of: a screw, rivet, and a combination key.

3. The reinforcement structure of claim 1, wherein the frame holes and corresponding stator holes are disposed in a vertical direction or in a horizontal direction depending upon selection of the fixing elements to be used in the disc motor.

4. The reinforcement structure of claim 3, wherein the frame holes and the corresponding stator holes, that are disposed in the horizontal direction, are provided for combination keys to inset therein.

5. The reinforcement structure of claim 3, wherein the holes and the corresponding stator holes, that are disposed in the horizontal direction, are formed as dovetail indentations.

6. The reinforcement structure of claim 1, wherein said plurality of locking grooves are bar-like slots, and said plurality of reinforcement ribs are bars.

7. The reinforcement structure of claim 1, wherein said plurality of locking grooves are formed underneath and at center of said plurality of armatures.

8. The reinforcement structure of claim 1, wherein the stator is made of a conductive material.

9. The reinforcement structure of claim 8, wherein the conductive material is selected from the group consisting of: a silicon steel and a soft magnetic composite (SMC).

* * * * *